US008908685B2

(12) United States Patent
Patel et al.

(10) Patent No.: US 8,908,685 B2
(45) Date of Patent: *Dec. 9, 2014

(54) ROUTING USING GLOBAL ADDRESS PAIRS

(71) Applicant: Microsoft Corporation, Redmond, WA (US)

(72) Inventors: Parveen Patel, Redmond, WA (US); Hasan Shamsuddin Alkhatib, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 158 days.

This patent is subject to a terminal disclaimer.

(21) Appl. No.: 13/714,008

(22) Filed: Dec. 13, 2012

(65) Prior Publication Data
US 2013/0100956 A1 Apr. 25, 2013

Related U.S. Application Data

(63) Continuation of application No. 12/895,580, filed on Sep. 30, 2010, now Pat. No. 8,351,430.

(51) Int. Cl.
*H04L 12/28* (2006.01)
*H04L 12/56* (2006.01)
*H04L 29/12* (2006.01)
*H04L 12/715* (2013.01)

(52) U.S. Cl.
CPC ........ *H04L 45/741* (2013.01); *H04L 29/12358* (2013.01); *H04L 29/12066* (2013.01); *H04L 61/251* (2013.01); *H04L 61/1511* (2013.01); *H04L 45/04* (2013.01)
USPC ............................ 370/389; 370/392; 370/401

(58) Field of Classification Search
CPC ............ H04L 29/12358; H04L 45/741; H04L 61/251; H04L 45/04
USPC .......................................... 370/389–392, 401
See application file for complete search history.

(56) References Cited

U.S. PATENT DOCUMENTS 6,523,068 B1 2/2003 Beser et al.
7,295,512 B2 * 11/2007 Takatani et al. ............... 370/229

(Continued)

FOREIGN PATENT DOCUMENTS

CN 1736077 2/2006
CN 1965515 5/2007

OTHER PUBLICATIONS

Wilson, Paul, "IPv6—What is it, Why is it Important, and Who is in Charge?", Asia-Pacific Business and Technology Report, Dec. 1, 2009, 3 pages.

(Continued)

*Primary Examiner* — Chuong T Ho
(74) *Attorney, Agent, or Firm* — Ben Tabor; Alin Corie; Micky Minhas

(57) ABSTRACT

The present invention extends to methods, systems, and computer program products for routing using global address pairs. Embodiments of the invention use publicly routable Internet Protocol ("IP") addresses to represent sites rather than individual hosts. Hosts can be represented by a global address pair, including site public IP address and a node private IP address. Nodes route packets to address processing modules using IP-in-IP encapsulation. An outer header contains a site public IP address and is destined to a site on inter-site links. An inner header contains a node private IP address and is destined to a private endpoint in intra-site links. In some embodiments, a site public IPv4 address and a node private IPv4 address are encoded into an IPv6 address. Use of an IPv6 address makes encoding of the two IPv4 address transparent to IPv6 applications.

20 Claims, 5 Drawing Sheets

(56) References Cited

U.S. PATENT DOCUMENTS

| | | |
|---|---|---|
| 7,385,981 B2 | 6/2008 | Choi |
| 7,443,880 B2 | 10/2008 | Wetterwald |
| 7,710,984 B2 | 5/2010 | Dunk |
| 7,764,686 B1 | 7/2010 | Toebes et al. |
| 2001/0040895 A1 | 11/2001 | Templin |
| 2003/0026258 A1* | 2/2003 | Takatani et al. ............... 370/392 |
| 2006/0146870 A1 | 7/2006 | Harvey |
| 2006/0215657 A1* | 9/2006 | Lee et al. ...................... 370/389 |
| 2008/0310344 A1 | 12/2008 | Krishnan et al. |
| 2010/0054250 A1 | 3/2010 | Kitamura et al. |
| 2011/0019677 A1 | 1/2011 | Townsley et al. |
| 2011/0310898 A1 | 12/2011 | Alkhatib |
| 2012/0082160 A1 | 4/2012 | Patel |

OTHER PUBLICATIONS

Fiuczynski, Marc E. et al., "The Design and Implementation of an IPv6/IPv4 Network Address and Protocol Translator", Based on information and belief available, at least as early as Jul. 27, 2010, 16 pages.

Notice of Allowance dated Sep. 18, 2012 cited in U.S. Appl. No. 12/895,580.

Office Action dated Jul. 19, 2012 cited in U.S. Appl. No. 12/895,580.

\* cited by examiner

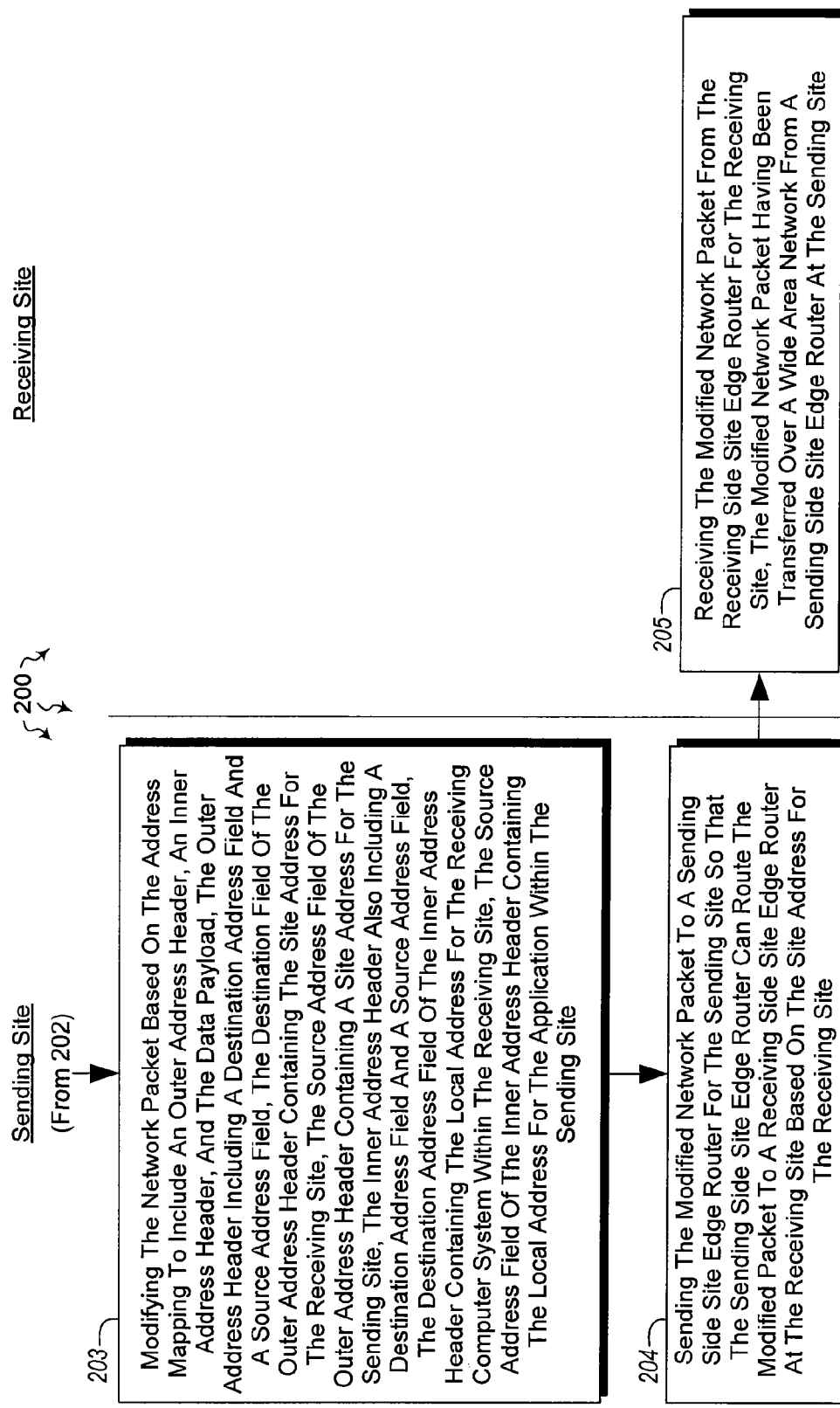

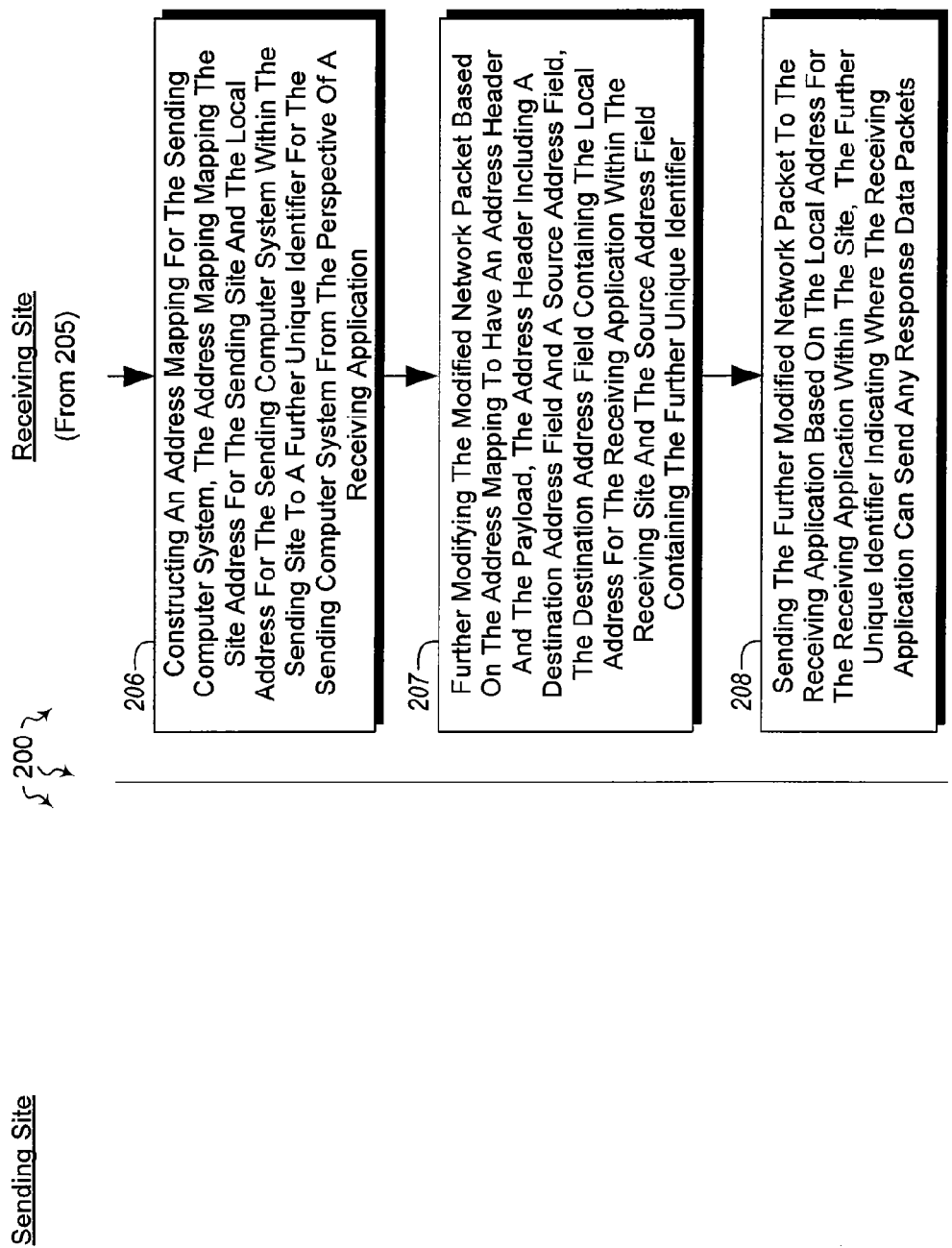

ROUTING USING GLOBAL ADDRESS PAIRS

CROSS-REFERENCE TO RELATED APPLICATIONS

This application is a continuation of U.S. patent application Ser. No. 12/895,580, filed on Sep. 30, 2010, entitled "ROUTING USING GLOBAL ADDRESS PAIRS," which issued as U.S. patent Ser. No. 8,351,430 on Jan. 8, 2013, and which application is expressly incorporated herein by reference in its entirety.

BACKGROUND OF THE INVENTION

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

To appropriately communicate between computer systems on a network, one computer system must have address information for another computer system. For example, for a computer system to communicate with another computer system on the Internet, the computer system typically uses an Internet Protocol ("IP") address for the other computer system. In most cases, communication on the Internet is based on Internet Protocol version 4 ("IPv4") addresses and thus each device communicating on the Internet is typically allocated an IPv4 address. There is a large and well established infrastructure for using IPv4 address on the Internet.

IPv4 addresses are 32-bit (four byte) addresses. Thus, IPv4 has an address space of 232 (4,294,967,296) possible unique addresses. Further, many of the addresses within the IPv4 address space are reserved for special purposes, such as, for example, private networks and multi-casting. As the number of unique devices on the Internet continues to grow, the number of unallocated IPv4 continues to decrease (and will eventually result in IPv4 address exhaustion). The rate of allocated to IPv4 address has been mitigated to some extent by changes in address allocation and routing infrastructure on the Internet. For example, classful networking and particularly classless inter-domain routing have substantially delayed IPv4 address exhaustion. In addition, network address translation ("NAT") permits large Internet Service Providers ("ISPs") to allocation a limited number (and potentially just one) public IPv4 address to their users. However, due to a continuing increase in the number of devices using the Internet, IPv4 address exhaustion will eventually occur.

Accordingly, Internet Protocol version 6 ("IPv6") was designed as the successor to IPv4. IPv6 uses a 128-bit (16 byte) address space providing a vastly larger address space of 2128 (or approximately 3.4×1038) unique addresses. IPv6 provides significantly flexibility in allocate addresses and routing traffic and eliminates the primary need for NAT. However, despite its advantages and its likely future dominance on the Internet, the deployment of IPv6 has been relatively slow. As such, IPv6 accounts for a very small portion of the used address and traffic on the Internet, which is still dominated by IPv4. This is due at least in part to costs associated with deploying IPv6.

These and other IPv6 deployment difficulties result in many organizations delaying deployment of IPv6 as long as possible. For example, due to ownership of significant and well established IPv4 infrastructure, an organization may desire to get as much return from existing infrastructure as possible. However, as other organizations deploy IPv6, IPv4 infrastructure must become compatible with IPv6. Likewise, any organization deploying IPv6 mostly likely has to remain compatible with IPv4. As such, organizations continuing to operate established IPv4 infrastructure as well as organizations that invest fully in IPv6 have to compatibly operate with both IPv4 and IPV6 addresses.

BRIEF SUMMARY

The present invention extends to methods, systems, and computer program products routing using global address pairs. A sending side address processing module at a sending site, receives a network packet from a sending application within the sending site. The network packet has an address header and a data payload. The address header includes a destination address field and a source address field. The destination address field contains a unique identifier for a receiving computer system from the perspective of the sending application. The source address field contains a local address for the sending application within the sending site. The data payload contains data for the receiving computer system.

The sending side address processing module accesses an address mapping from a sending side local store. The address mapping maps the unique identifier to a site address for the receiving site and to a local address for the receiving computer system within the receiving site The sending side address processing module modifies the network packet based on the address mapping to include an outer address header, an inner address header, and the data payload. The outer address header includes a destination address field and a source address field. The destination field of the outer address header contains the site address for the receiving site. The source address field of the outer address header contains a site address for the sending site. The inner address header also includes a destination address field and a source address field. The destination address field of the inner address header contains the local address for the receiving computer system within the receiving site. The source address field of the inner address header contains the local address for the application within the sending site.

The sending side address processing module sends the modified network packet to a sending side site edge router for the sending site. The sending side site edge router routes the modified packet to a receiving side site edge router at the receiving site based on the site address for the receiving site.

A receiving side address processing module receives the modified network packet from the receiving side site edge router. The network packet was transferred over a wide area network from the sending side site edge router. The receiving side address processing module accessing an address mapping from a receiving side local store. The address mapping maps the site address for the sending site and the local address for the sending computer system within the sending site to a further unique identifier for the sending computer system from the perspective of the receiving application.

The receiving side address processing module further modifies the modified network packet based on the address mapping to have an address header and the payload. The address header includes a destination address field and a source address field. The destination address field contains the local address for the receiving application within the receiving site and the source address field contains the further unique identifier. The receiving side address processing module sends the further modified network packet to the receiving application based on the local address for the receiving application within the site. The further unique identifier indicates where the receiving application can send any response data packets.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
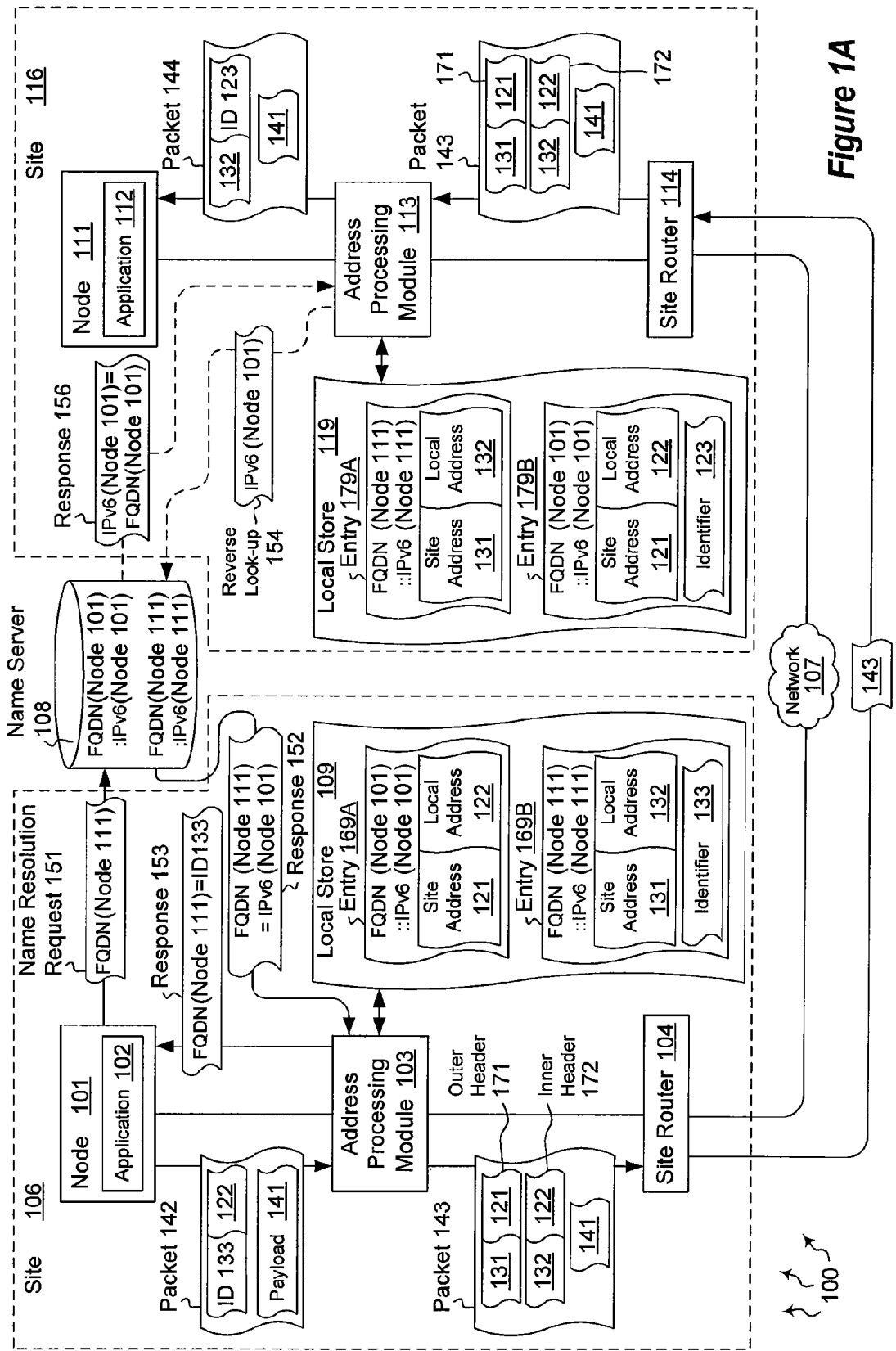
FIGS. 1A and 1B illustrates an example computer architecture that facilitates routing using global address pairs.

The present invention extends to methods, systems, and computer program products for routing using global address pairs. A sending side address processing module at a sending site, receives a network packet from a sending application within the sending site. The network packet has an address header and a data payload. The address header includes a destination address field and a source address field. The destination address field contains a unique identifier for a receiving computer system from the perspective of the sending application. The source address field contains a local address for the sending application within the sending site. The data payload contains data for the receiving computer system.

The sending side address processing module accesses an address mapping from a sending side local store. The address mapping maps the unique identifier to a site address for the receiving site and to a local address for the receiving computer system within the receiving site The sending side address processing module modifies the network packet based on the address mapping to include an outer address header, an inner address header, and the data payload. The outer address header includes a destination address field and a source address field. The destination field of the outer address header contains the site address for the receiving site. The source address field of the outer address header contains a site address for the sending site. The inner address header also includes a destination address field and a source address field. The destination address field of the inner address header contains the local address for the receiving computer system within the receiving site. The source address field of the inner address header contains the local address for the application within the sending site.

The sending side address processing module sends the modified network packet to a sending side site edge router for the sending site. The sending side site edge router routes the modified packet to a receiving side site edge router at the receiving site based on the site address for the receiving site.

A receiving side address processing module receives the modified network packet from the receiving side site edge router. The network packet was transferred over a wide area network from the sending side site edge router. The receiving side address processing module accessing an address mapping from a receiving side local store. The address mapping maps the site address for the sending site and the local address for the sending computer system within the sending site to a further unique identifier for the sending computer system from the perspective of the receiving application.

The receiving side address processing module further modifies the modified network packet based on the address mapping to have an address header and the payload. The address header includes a destination address field and a source address field. The destination address field contains the local address for the receiving application within the receiving site and the source address field contains the further unique identifier. The receiving side address processing module sends the further modified network packet to the receiving application based on the local address for the receiving application within the site. The further unique identifier indicates where the receiving application can send any response data packets.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices.

When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Generally, embodiments of the invention use publicly routable Internet Protocol ("IP") addresses to represent sites rather than individual hosts. Hosts can be represented by a global address pair, including site public IP address and a node private IP address. Nodes route packets to address processing modules using IP-in-IP encapsulation. An outer header contains a site public IP address and is destined to a site on inter-site links. An inner header contains a node private IP address and is destined to a private endpoint in intra-site links. In some embodiments, a site public IPv4 address and a node private IPv4 address are encoded into an IPv6 address. Use of an IPv6 address makes encoding of the two IPv4 address transparent to IPv6 applications.

Figure 1B:
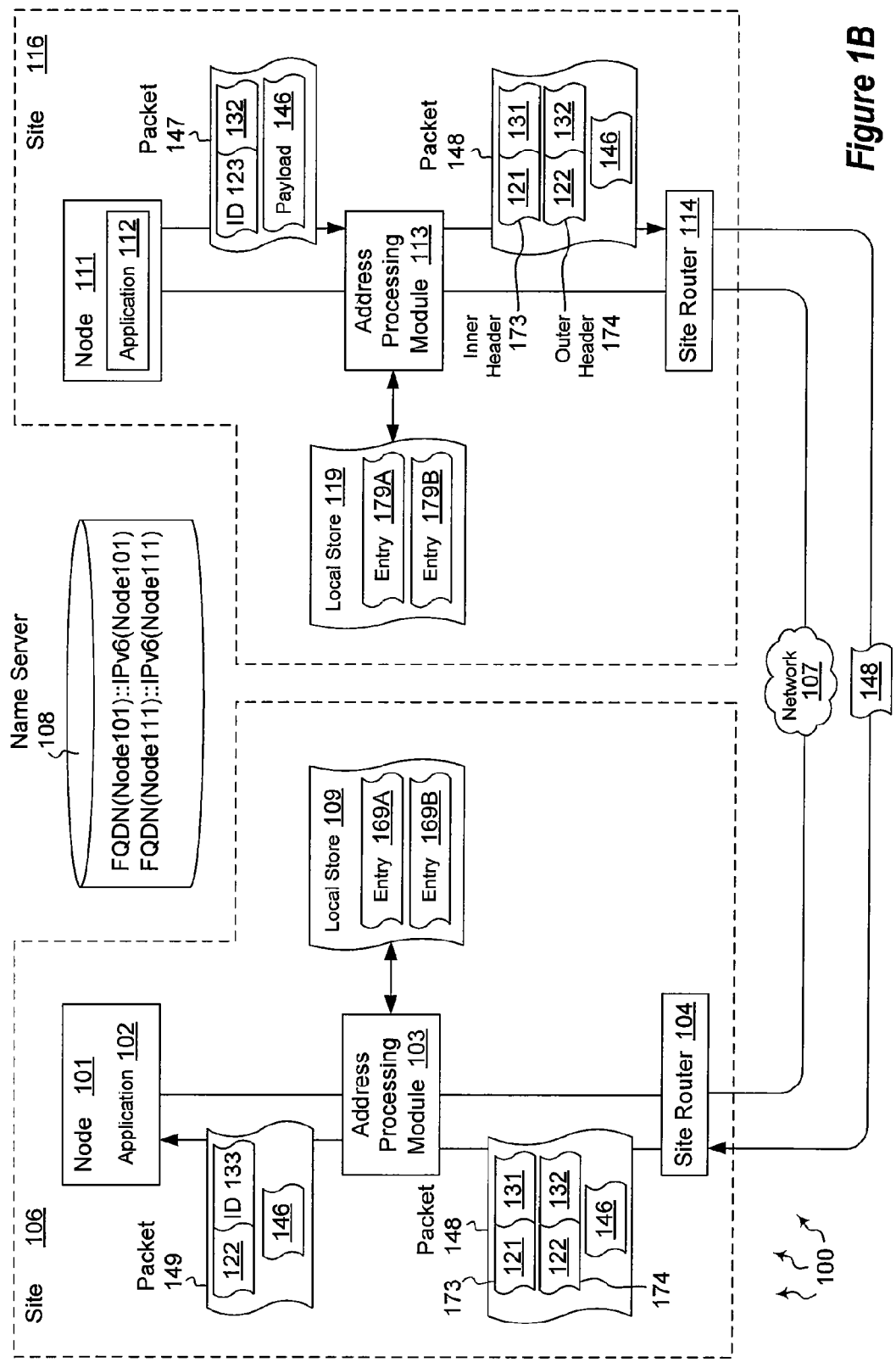

FIGS. 1A and 1B illustrate an example computer architecture 100 that facilitates routing using global address pairs. Referring to FIG. 1, computer architecture 100 includes site 106 and site 116. Sites 106 and 116 are connected to one another over (or are part of) network 107, such as, for example, a Local Area Network ("LAN"), a Wide Area Network ("WAN"), and even the Internet. Accordingly, Connected computer systems and other components within sites 106 and 116, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, site 106 includes node 101, address processing module 103, and site router 104. Node 101 further includes application 102. Similarly, site 116 includes node 111, address processing module 113, and site router 114. Node 111 further includes application 112.

Name server 108 contains a number of entries binding domain names to IP addresses, including globally unique IPv6 address. Local address 122 is a private IPv4 address for node 101 within site 106. Site address 121 is a public IPv4 address for site 106. Name server 108 can bind a fully qualified domain name for node 101 to an IPv6 address (i.e., IPv6(Node 101)). Site 106 can maintain addressing information for node 101 in entry 169A in local store 109.

Similarly, local address 132 is a private IPv4 address for node 111 within site 116. Site address 131 is a public IPv4 address for site 116. Name server 108 can also bind a fully qualified domain name for node 111 to an IPv6 address (i.e., IPv6(Node 111)). Site 116 can maintain addressing information for node 111 in entry 179A in local store 119

Globally unique IPv6 address contained in name server 108 can encode a pair of IPv4 address, a site IPv4 address and a local IPv4 address, in accordance with algorithms that are also know to address processing modules 103 and 113. For example, IPv6(Node 101) can encode site address 121 and local address 122. Likewise, IPv6(Node 111) can encodes site address 131 and local address 132.

Thus, upon receiving a globally unique IPv6 address, address processing modules 103 and 113 can extract an encoded site IPv4 address and local IPv4 address from the globally unique IPv6 address. For example, site address 121 and local address 122 can be extracted from IPv6(Node 101). Likewise, site address 131 and local address 132 can be extracted from IPv6(Node 111).

The algorithms can also be reversible such that a site IPv4 address and a local IPv4 address can be combined into a corresponding globally unique IPV6 address that encodes the site IPv4 address and a local IPv4 address. For example, site address 121 and local address 122 can be combined into IPv6 (Node 101). Likewise, site address 131 and local address 132 can be combined into IPv6 (Node 111).

Figure 2:
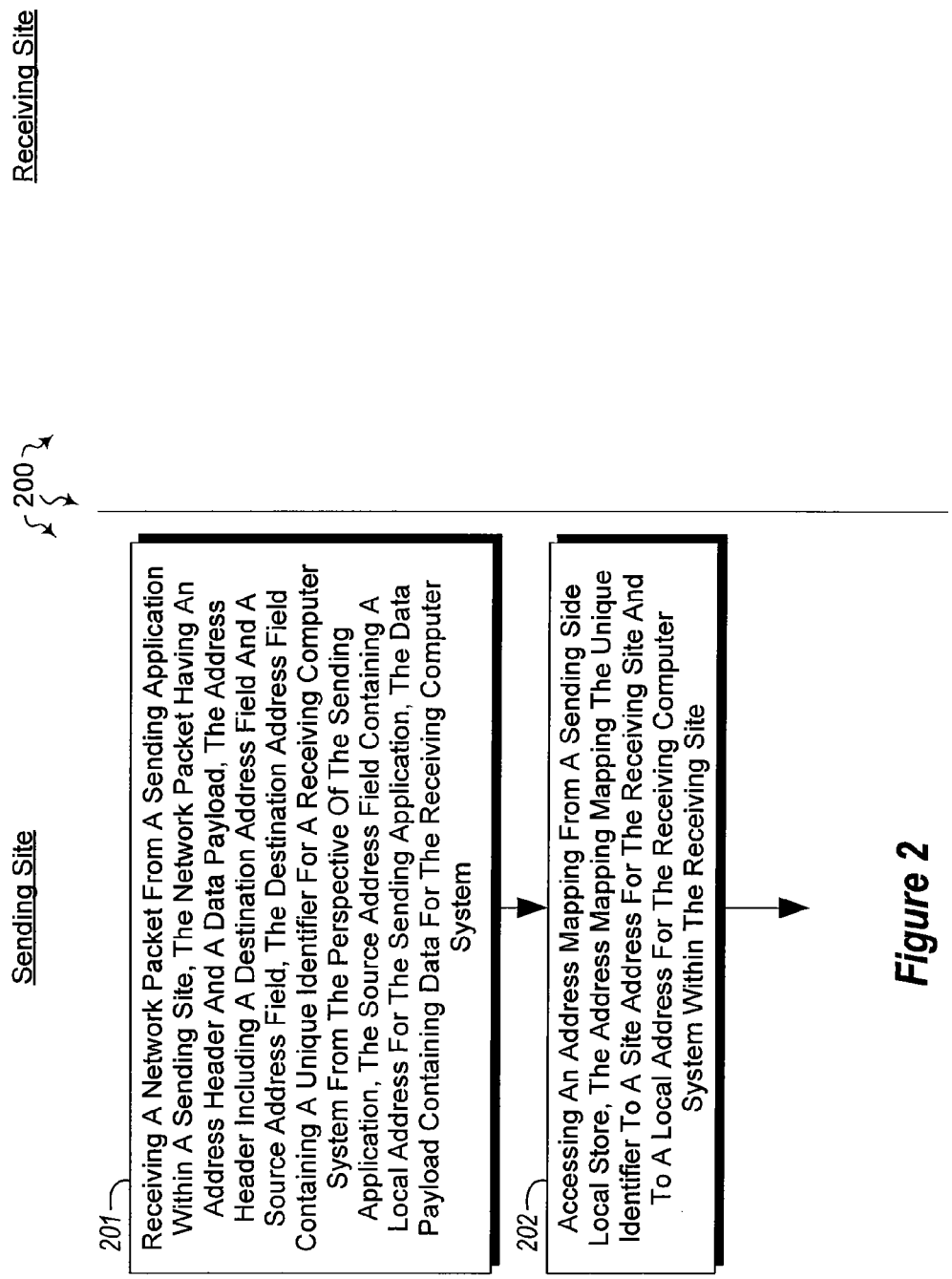
FIG. 2 illustrates a flow chart of an example method for routing using global

FIG. 2 illustrates a flow chart of an example method 200 for routing using global address pairs. Method 200 will be described with respect to the components and data of computer architecture 100.

Node 101 can know node 111 with a unique name, such as, for example, a fully qualified domain name, and vice versa. Application 102 may desire to communicate with application 112. Node 101 can issue name resolution request 151 to name server 108. Name resolution request 151 can be a request for an IP address bound to the fully qualified domain name for node 111 (i.e., FQDN(Node111)). Name server 108 can determine that IPv6(Node 111) is a globally unique IPv6 address bound to FQDM (Node 111). Name server 108 can return response 152 to address processing module 103. Response 152 indicates the binding between FQDM (Node 111) and IPv6(Node 111).

Address processing module 103 can extract site address 131 and local address 132 from IPv6(Node 111). Address processing module 132 can also formulate unique identifier 133. Application 102 is to use unique identifier 133 to refer to node 111. When application 102 uses only IPv4, unique identifier 133 is selected as a unique four byte identifier for node 111 from the perspective of application 102. When application 102 is IPv6 compatible, then unique identifier 133 is IPv6(Node 111). Address processing module 103 can store addressing information for node 111 in entry 169B in local store 109.

Address processing module 103 can return response 153 to application 102 in response to application 151 sending name resolution request 151. Response 153 indicates that FQDN (Node 111) is bound to identifier 133. Thus, when application 102 is to communicate with node 111, application 102 uses identifier 133 as the destination address for the communication. Address processing module 103 can then handle using the appropriate site address and local address to forward the communication onto node 111.

After issuing name resolution request 151, application 102 can send packet 142 to node 111.

Method 200 includes an act of receiving a network packet from a sending application within a sending site, the network packet having an address header and a data payload, the address header including a destination address field and a source address field, the destination address field containing a unique identifier for a receiving computer system from the perspective of the sending application, the source address field containing a local address for a sending application within the sending site, the data payload containing data for the receiving computer system (act 201). For example, address processing module 103 can receive packet 142 from application 102. Packet 142 has an address header including identifier 133 in a destination address field and local address 122 in a source address field. Payload 141 contains data for node 111.

Method 200 includes an act of accessing an address mapping from a sending side local store, the address mapping mapping the unique identifier to a site address for the receiving site and to a local address for the receiving computer system within the receiving site (act 202). For example, address processing module 103 can access entry 169B from local store 109. Entry 169B maps identifier 133 to site address 131 and local address 132.

Method 200 includes an act of modifying the network packet based on the address mapping to include an outer address header, an inner address header, and the data payload, the outer address header including a destination address field and a source address field, the destination field of the outer address header containing the site address for the receiving site, the source address field of the outer address header containing a site address for the sending site, the inner address header also including a destination address field and a source address field, the destination address field of the inner address header containing the local address for the receiving computer system within the receiving site, the source address field of the inner address header containing the local address for the application within the sending site (act 203). For example, address processing module 103 can modify packet 142 into packet 143 based on the contents of entry 169B. Packet 143 includes outer header 171, inner header 172, and payload 141. Outer header 171 includes site address 131 in a destination address field and site address 121 in a source address field. Inner header 172 includes local address 132 in a destination address field and local address 122 in a source address field. Payload 141 contains data for node 111.

In some embodiments, inner header 172 is encapsulated (e.g., using IP-in-IP encapsulation) within outer header 171. Outer header 171 can be added before inner header 142 in packet 143. The destination address field and source address field of outer header 171 essentially identifier endpoints of a tunnel. The destination address field and source address field of inner header 172 identify the original sender and recipient of packet 143 (e.g., a datagram).

Method 200 includes an act of sending the modified network packet to a sending side site edge router for the sending site so that the sending side site edge router can route the modified packet to a receiving side site edge router at the receiving site based on the site address for the receiving site (act 204). For example, address processing module 103 can send packet 143 to site router 104. Site router 104 can forward packet 143 onto network 107.

Routers within network 107 can route packet 107 to site 116 based on the destination address field of outer header 171 contained site address 131. Eventually, packet 143 is routed to site router 114. Site router 114 can forward packet 143 to address processing module 113.

Method 200 includes an act of receiving the modified network packet from the receiving side site edge router for the receiving site, the network packet having been transferred over a wide area network from a sending side site edge router at the sending site (act 205). For example, address processing module 113 can receive packet 143 from site router 114 after network packet 143 is transferred over network 107 from site router 104.

Method 200 includes an act of constructing an address mapping for the sending computer system, the address mapping mapping the site address for the sending site and the local address for the sending computer system within the sending site to a further unique identifier for the sending computer system from the perspective of the receiving application (act 206). For example, address processing module 113 can construct a mapping that maps site address 121 and local address 122 to identifier 123. Application 112 is to use unique identifier 123 to refer to node 101

Address processing module 113 can combine address 121 and local address 122 into IPv6 (Node 101) in accordance with known algorithms. Address processing module 132 can also formulate unique identifier 123. When application 112 uses only IPv4, unique identifier 123 is selected as a unique four byte identifier for node 101 from the perspective of application 112. When application 112 is IPv6 compatible, then unique identifier 123 is IPv6(Node 101). Address processing module 113 can store addressing information for node 101 in entry 179B in local store 119.

Method 200 includes an act of further modifying the modified network packet based on the address mapping to have an address header and the payload, the address header including a destination address field and a source address field, the destination address field containing the local address for the receiving application within the receiving site and the source address field containing the further unique identifier (act 207). For example, address processing module 113 can modify packet 143 into packet 144 based on data in entry 179B (before and/or after entry 179B is stored in local store 119). Packet 144 has an address header with a destination address field containing local address 132 and a source address field containing identifier 123. Payload 141 contains data for application 112.

Method 200 includes an act of sending the further modified network packet to the receiving application based on the local address for the receiving application within the site, the further unique identifier indicating where the receiving application can send any response data packets (act 208). For example, address processing module 113 can send packet 144 to application 112 based on local address 132. Identifier 123 indicates where application 112 is to send any data packets responsive to packet 144.

Address processing module 113 may choose to resolve IPv6(Node 101) to FQDN(Node 101) by performing a reverse lookup at name server 108. For example, address processing module 113 can issue reverse lookup 154 to name server 108. Name server 108 can refer to the FQDN(Node 101)::IPv6(Node101) binding to identifier FQDN(Node 101). Name server 108 can return response 156 back to address processing module indicating that IPv6(Node101)= FQDN(Node 101). Address processing module 113 can store the contents of response 156 in entry 179B in local store 119.

Application 112 can also send a message back to node 101. For example, application 112 can send packet 147 to node 101. Address processing module 113 can receive packet 147 from application 102. Packet 147 has an address header including identifier 123 in a destination address field and local address 132 in a source address field. Payload 146 contains data for node 101. Address processing module 113 can access entry 179B from local store 119. Entry 179B maps identifier 133 to site address 121 and local address 122.

Address processing module 113 can modify packet 147 into packet 148 based on the contents of entry 179B. Packet 148 includes outer header 173, inner header 174, and payload 146. Outer header 173 includes site address 121 in a destination address field and site address 131 in a source address field. Inner header 174 includes local address 122 in a destination address field and local address 132 in a source address field. Payload 146 contains data for node 101 Inner header 174 can be encapsulated (e.g., using IP-in-IP encapsulation) within outer header 173 as previously described.

Address processing module 113 can send packet 148 to site router 114. Site router 114 can forward packet 148 onto network 107. Routers within network 107 can route packet 107 to site 106 based on the destination address field of outer header 171 contained site address 121. Eventually, packet 148 is routed to site router 104. Site router 104 can forward packet 148 to address processing module 103.

Address processing module 103 can receive packet 148 from site router 104 after network packet 148 is transferred over network 107 from site router 114. Address processing module 103 can access entry 169B that maps site address 131 and local address 132 to identifier 133. Address processing module 103 can modify packet 148 into packet 149 based on data in entry 169B. Packet 149 has an address header with a destination address field containing local address 122 and a source address field containing identifier 133. Payload 146 contains data for application 102. Address processing module 103 can send packet 104 to application 102 based on local address 122. Identifier 133 indicates where application 102 is to send any data packets responsive to packet 149.

In some embodiments, there is a single address processing module for an entire site. The single address processing module can be embedded in to the site edge router and carry the same public address as the site edge router. For example, address processing module 103 can be embedded in and carry the same public address as site router 104 (i.e., site address 121 is the address of site router 104).

In other embodiments, address processing modules are distributed in across various nodes within a site. In these other embodiments, a site address is associated with all address processing modules in the site. Thus the site address is essentially utilized as a multi-cast address reaching all address processing modules in the site. For example, site 106 may contain one or more other address processing modules in addition to address processing module 103. Any packets sent to site address 121 reach address processing module 103 as well as each of the one or more other address processing modules.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A storage device having stored instructions which, when executed by at least one computing processor, implement a method for sending communications, the method comprising:

an act of receiving a network packet from an application at a computer system within a site, the network packet having an address header and a data payload, the address header including a destination address field and a source address field, the destination address field containing a unique identifier for another computer system at another site from the perspective of the application, the source address field containing a local address for the application within the site, the data payload containing data for the other computer system;

an act of accessing an address mapping that maps the unique identifier to a site address for the other site and to a local address for the other computer system within the other site;

an act of modifying the network packet based on the address mapping to include an outer address header, an inner address header, and the data payload, the outer address header including a destination address field and a source address field, the destination field of the outer address header containing the site address for the other site, the source address field of the outer address header containing a site address for the site, the inner address header also including a destination address field and a source address field, the destination address field of the inner address header containing the local address for the other computer system within the other site, the source address field of the inner address header containing the local address for the application within the site; and an act of sending the modified network packet to the other site based on the site address for the other site.

2. The storage device as recited in claim 1, further comprising prior to modifying the network packet:

an act of receiving global address pair information for the other computer system from a name server, the global address pair information being received in response to a name resolution request sent from the application to the name server, the global address pair information including the site address for the other site and the local address for the other computer system within the other site;

an act of formulating the unique identifier from the global address pair information;

an act of storing the address mapping within a local store; and an act of returning the unique identifier to the application.

3. The storage device as recited in claim 2, wherein the act of receiving global address pair information for the other computer system comprises an act of receiving a globally unique IPv6 address for the other computer system.

4. The storage device as recited in claim 3, wherein the act of formulating the unique identifier from the global address pair information comprises an act of making the unique identifier the globally unique IPv6 address.

5. The storage device as recited in claim 3, wherein the act of formulating the unique identifier from the global address pair information comprises an act of formulating a unique identifier from the globally unique IPv6 address.

6. The storage device as recited in claim 1, wherein the act of receiving the network packet comprises an act of receiving a packet that contains a globally unique IPv6 address for the other computer system in the destination address field.

7. The storage device as recited in claim 1, wherein the act of accessing an address mapping includes accessing an address mapping from a local store and wherein the address mapping maps the unique identifier for the other computer system to an IPv4 address for the other site and an IPv4 address for the other computer system within the other site.

8. The storage device as recited in claim 7, wherein the act of sending the modified network packet includes sending the modified packet to a site edge router for the site so that the site edge router can route the modified packet to a site edge router at the other site based on the site address based on the IPv4 address for the other site.

9. The storage device as recited in claim 7, wherein the address mapping maps the unique identifier for the other computer system to an IPv4 address for the other site and an IPv4 address for the other computer system within the other site and wherein the address mapping further maps a globally unique IPv6 address for the other computer system to the IPv4 address for the other site and the IPv4 address for the other computer system within the other site.

10. The storage device of claim 1, wherein the modifying and sending are both performed by a router associated with the site.

11. A storage device having stored instructions which, when executed by at least one computing processor, implement a method for receiving communications, the method comprising:
 an act of receiving a network packet at a site, the network packet having been transferred over a wide area network from another site, the network packet including an outer address header, an inner address header, and a data payload, the outer address header including a destination address field and a source address field, the destination field of the outer address header containing a site address for the site, the source address field of the outer address header containing a site address for the other site, the inner address header also including a destination address field and a source address field, the destination field of the inner address header containing the local address for an application within the site, the source address field of the inner address header containing the local address for the other computer system within the other site;
 an act of accessing an address mapping that maps the site address for the other site and the local address for the other computer system within the other site to a unique identifier for the other computer system from the perspective of the application;
 an act of modifying the network packet based on the address mapping to have an address header and the payload, the address header including a destination address field and a source address field, the destination address field containing the local address for the application within the site and the source address field containing the unique identifier; and
 an act of sending modified network packet to the application based on the local address for the application within the site, the unique identifier indicating where the application can send any response data packets.

12. The storage device as recited in claim 11, wherein said receiving the network packet includes receiving the network packet from a site edge router for the site and wherein the destination field of the outer address header of the network packet contains an IPv4 address for the site and wherein the destination address field of the inner address header of the network packet contains a local IPv4 address for the application within the site.

13. The storage device as recited in claim 12, wherein the method further comprises an act of formulating a globally unique IPv6 address for the application from the IPv4 address for the site and the local IPv4 address for the application within the site.

14. The storage device as recited in claim 13, wherein the method further comprises:
 an act of issuing a reverse name lookup to a name server, the reverse lookup containing the globally unique IPv6 address; and
 an act of receiving a name for the application back from the name server.

15. The storage device as recited in claim 12, wherein prior to accessing the address mapping the method further comprises:
 an act of formulating the unique identifier for the other computer system from the IPv4 address for the other site and the local IPv4 address for the other computer system within the other site; and
 storing the address mapping in a local store.

16. The storage device as recited in claim 15, wherein the act of formulating the unique identifier for the other computer system comprises:
 an act of formulating a globally unique IPv6 address from the IPv4 address for the other site and the local IPv4 address for the other computer system within the other site; and
 an act of making the unique identifier the globally unique IPv6 address for the other computer system.

17. The storage device as recited in claim 16, wherein the destination field of the outer address header of the received network packet contains a site IPv4 address for the site, the source address field of the outer address header contains a site IPv4 address for the other site, the destination address field of the inner address header contains a local IPv4 address for the application within the site, and the source address field of the inner address header contains the local IPv4 address for the other computer system within the other site.

18. The storage device as recited in claim 17, wherein the act of modifying the network packet based on the address mapping comprises an act of modifying the network packet to include a destination address field containing the local IPv4 address for the application within the site and to include a source address field containing the globally unique IPv6 address for the other computer system.

19. The storage device as recited in claim 11, wherein the method further comprises:
 an act of receiving a further network packet from the application having an address header and a data payload, the address header of the further network packet including a destination address field and a source address field, the destination address field containing the unique identifier, the source address field containing the local address for the application within the site, the data payload containing data for the other computer system;

an act of accessing the address mapping;

an act of modifying the further network packet based on the address mapping to include an outer address header, an inner address header, and the data payload, the outer address header including a destination address field and a source address field, the destination field of the outer address header containing the site address for the other site, the source address field of the outer address header containing a site address for the site, the inner address header also including a destination address field and a source address field, the destination address field of the inner address header containing the local address for the other computer system within the other site, the source address field of the inner address header containing the local address for the application within the site; and an act of sending the modified further network packet to the other site based on the site address for the other site.

20. The storage device of claim 11, wherein the modifying is performed by a router associated with the site.

* * * * *